(12) United States Patent
Popp et al.

(10) Patent No.: US 10,428,782 B2
(45) Date of Patent: Oct. 1, 2019

(54) STARTING A MOTOR VEHICLE DRIVE UNIT

(71) Applicant: GM GLOBAL TECHNOLOGY OPERATIONS LLC, Detroit, MI (US)

(72) Inventors: Dietmar Popp, Mainz (DE); Nicolas Frevert, Oppenheim (DE); Kevin Buhle, Darmstadt (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 45 days.

(21) Appl. No.: 15/882,427

(22) Filed: Jan. 29, 2018

(65) Prior Publication Data
US 2018/0216594 A1    Aug. 2, 2018

(51) Int. Cl.
*F02N 11/08*    (2006.01)

(52) U.S. Cl.
CPC .. *F02N 11/0807* (2013.01); *F02N 2200/0802* (2013.01); *F02N 2200/0803* (2013.01)

(58) Field of Classification Search
CPC ............ F02N 11/0807; F02N 11/0851; F02N 2200/0803; F02N 2200/0802
USPC ................ 123/179.3, 179.4, 179.28, 179.25; 701/112, 113
See application file for complete search history.

(56) References Cited

U.S. PATENT DOCUMENTS

| | | | |
|---|---|---|---|
| 2006/0052911 A1* | 3/2006 | Ochs | B60R 25/045 701/2 |
| 2018/0051758 A1* | 2/2018 | Parada Centeno | F16D 48/064 |

* cited by examiner

*Primary Examiner* — Hai H Huynh
(74) *Attorney, Agent, or Firm* — Lorenz & Kopf, LLP

(57) ABSTRACT

The present disclosure pertains to remote starting of a drive unit in a stationary motor vehicle. The drive unit includes one or more driving wheels, a clutch and a gearbox for coupling and decoupling the drive unit and the driving wheels. A starting signal is received by a control unit. The control unit only starts the drive unit in response to the received starting signal when it is detected that the drive unit and the driving wheel arrangement are decoupled and/or that the motor vehicle is at a standstill.

6 Claims, 1 Drawing Sheet

STARTING A MOTOR VEHICLE DRIVE UNIT

CROSS-REFERENCE TO RELATED APPLICATION

This application claims priority to German Patent Application No. 102017000841.8, filed Jan. 31, 2017, which is incorporated herein by reference in its entirety.

TECHNICAL FIELD

The present disclosure pertains to a method and a control system for starting a drive unit of a motor vehicle, as well as to a motor vehicle, particularly a passenger car, with the control system and to a computer program product for carrying out the method.

BACKGROUND

Certain vehicles today include remote start systems and algorithms that enable a user of the vehicle to remotely start a drive unit of the vehicle. Such a remote start may be desired, for example, if the user wishes to have the vehicle's interior heated or cooled before the user enters the vehicle.

SUMMARY

Accordingly, the present disclosure provide an improved method and system for starting a drive unit of a motor vehicle, particularly such a remote-controlled start.

In particular, an embodiment of the present disclosure provides a motor vehicle, particularly a passenger car, having a drive unit for driving a driving wheel arrangement of the motor vehicle with one or more driving wheels, as well as a clutch and a gearbox, by which the drive unit and the driving wheel arrangement can be selectively coupled and decoupled. The drive unit may include an internal combustion engine and/or one or more electric machines. Generally, the gearbox includes multiple driving gears with different transmission ratios and/or an infinitely variable transmission ratio and/or a neutral gear, in which an input and an output of the transmission are decoupled from one another. In an embodiment, the gearbox is a partially or completely automated gearbox, particularly an electrically controlled gearbox. In another embodiment, the gearbox is a manual (or manually actuated) gearbox and functionally connected, particularly mechanically and/or hydraulically, to a gearshift lever, in order to manually shift the gearbox. In an embodiment, a drive unit of a motor vehicle with a manual gearbox can thereby also be started in a remote-controlled fashion.

According to an embodiment of the present disclosure, a method for starting the drive unit of a stationary motor vehicle, particularly a parked motor vehicle is provided. Initially, a starting signal is received by the vehicle. The drive unit is only started in response to the received starting signal when it is detected that the drive unit and the driving wheel arrangement are decoupled and/or that the motor vehicle is at a standstill.

In an embodiment, the starting signal is received wirelessly and/or from a transmitter that is located at a distance from the motor vehicle, i.e. the starting signal may particularly be a remote (control) starting signal. Thus, the motor vehicle can thereby already be at least partially put into operation prematurely such that the drive unit itself and/or other parts of the motor vehicle can be preheated or the like by the started drive unit.

Since the drive unit is only started in response to the received starting signal when it is detected that the drive unit and the driving wheel arrangement are decoupled, the driving wheel arrangement can in an advantageous embodiment be prevented from being inadvertently driven when the drive unit is started and/or from impairing the start of the drive unit.

Since the drive unit is only started in response to the received starting signal when it is detected that the motor vehicle is at a standstill, the motor vehicle can in an advantageous embodiment be prevented from being inadvertently set in motion when its drive unit is started, particularly due to a decoupling of the drive unit and the driving wheel arrangement for starting the drive unit.

In an embodiment, a decoupling of the drive unit and the driving wheel arrangement is at least partially or only detected, when the clutch is opened in an automated fashion, particularly after the reception of the starting signal. Additionally or alternatively, a decoupling of the drive unit and the driving wheel arrangement is at least partially or only detected, when the gearbox is decoupled in an automated fashion, particularly after the reception of the starting signal. Additionally or alternatively, a decoupling of the drive unit and the driving wheel arrangement is at least partially or only detected, when it is determined that the clutch is opened after the reception of the starting signal. Additionally or alternatively, a decoupling of the drive unit and the driving wheel arrangement is in an embodiment at least partially or only detected, when it is determined that the gearbox is decoupled, after the reception of the starting signal. In an enhancement, a decoupling of the drive unit and the driving wheel is only detected when it is at least determined that the clutch is opened or the gearbox is decoupled.

In this way, the driving wheel arrangement can in an advantageous embodiment be prevented from being inadvertently driven when the drive unit is started and/or from impairing the start of the drive unit, wherein this can in an enhancement be achieved in a particularly reliable fashion.

In an embodiment, the drive unit and the driving wheel arrangement are decoupled, particularly in an automated fashion, in response to the received starting signal, by opening the clutch, particularly in an automated fashion, with the aid of a clutch actuator, particularly an at least partially electric or electrically controlled and/or actuated and/or acting clutch actuator, particularly always or only when needed, particularly only when it is determined that the clutch is (still) closed and/or it is determined that the gearbox is not decoupled. In an embodiment, the clutch particularly is a so-called "e-clutch."

In this way, a motor vehicle can in an advantageous embodiment also be started in a remote-controlled fashion when a gearbox, particularly a manual gearbox, is shifted into a driving gear without thereby causing the driving wheel arrangement to be inadvertently driven and/or to impair the start of the drive unit when the drive unit is started.

In an embodiment, a standstill of the motor vehicle is detected, particularly only or at least detected, when at least one brake of the motor vehicle, particularly an at least partially electric brake, is closed, particularly in an automated fashion. Additionally or alternatively, a standstill of the motor vehicle is in an embodiment detected, particularly only or at least detected, when it is determined that at least one brake of the motor vehicle, particularly this or another checkable and/or at least partially electric brake, is closed. Additionally or alternatively, a standstill of the motor vehicle is in an embodiment detected, particularly only or at least detected, when it is determined that the drive unit and the driving wheel arrangement are decoupled, particularly that (at least) the clutch is opened or the gearbox is decoupled, within a predefined (checking) period before, during or after the reception of the starting signal. In an enhancement, a standstill of the motor vehicle is only detected when it is determined that at least one brake of the motor vehicle is closed.

Since a standstill of the motor vehicle is detected when at least one brake of the motor vehicle is closed or when it is determined that at least one brake of the motor vehicle is closed, particularly only detected when it is determined that at least one brake of the motor vehicle is closed, the motor vehicle can in an embodiment be advantageously prevented, particularly reliably prevented, from being inadvertently set in motion due to a decoupling of the drive unit and the driving wheel arrangement for starting the drive unit.

When it is detected that the drive and the driving wheel are already decoupled within the predefined (checking) period, it can in an embodiment be assumed that the motor vehicle will not be inadvertently set in motion when the drive unit is started without (additionally) closing at least one brake and it is therefore unnecessary to (additionally) close at least one brake.

In an embodiment, one or more actuatable brakes of the motor vehicle is/are closed, particularly in an automated fashion, in response to the received starting signal, particularly closed in an at least partially electric fashion, particularly always or only when needed, particularly only when it is determined that these actuatable brakes or one or more other checkable brakes is/are not closed or when it is determined that the drive unit and the driving wheel are decoupled, particularly that the clutch is opened or the gearbox is decoupled, within a predefined (checking) period, particularly the (checking) period), before, during or after the reception of the starting signal.

In an embodiment, the or at least one of the actuatable brake(s) particularly is an at least partially electric service brake or particularly an at least one partially electric handbrake or parking brake, wherein the or at least one of the other checkable brake(s) is/are in an enhancement a corresponding hand/parking brake, particularly an at least partially electric hand/parking brake, or a corresponding service brake, particularly an at least partially electric service brake.

In this way, the motor vehicle can in an advantageous embodiment be prevented from being inadvertently set in motion due to a decoupling of the drive unit and the driving wheel arrangement for starting the drive unit. In an embodiment, the unnecessary (additional) closing of at least one brake can thereby be additionally or alternatively eliminated.

In an embodiment, the drive unit and the driving wheel arrangement are (only) decoupled, particularly by (only) opening the clutch with the aid of the clutch actuator, particularly the at least partially electric clutch actuator, after at least one (actuatable) brake of the motor vehicle has been closed in response to the received starting signal or it has been determined that at least one (checkable) brake of the motor vehicle is closed.

In this way, the motor vehicle can in an advantageous embodiment be prevented from being inadvertently set in motion, particularly briefly until the (actuatable) brake is closed, due to a decoupling of the drive unit and the driving wheel arrangement for starting the drive unit.

In an embodiment, the method includes controlling, particularly starting and/or regulating, one or more devices, particularly at least one temperature control device, particularly a heating device, particularly for the drive unit and/or a passenger compartment and/or one or more windows of the motor vehicle, and/or at least one entertainment and/or navigation system of the motor vehicle in response to the starting signal when the drive unit is started or, in particular, with a predefined (lead) time after the drive unit has been started.

In this way, such devices can be advantageously remote-controlled.

According to an embodiment of the present disclosure, a control system for starting a drive unit, particularly in the form of hardware and/or software technology, particularly program technology, is configured to carry out a method described herein. In particular, the control system is configured to receive a starting signal and only start the drive unit in response to the received starting signal when it is detected that the drive unit and the driving wheel arrangement are decoupled and/or that the motor vehicle is at a standstill.

In an embodiment, the control system may be further configured to determine that the drive unit and the driving wheel arrangement are decoupled when the clutch is opened or the gearbox is decoupled or when the clutch is opened or the gearbox is decoupled. The control system maybe further configured to decouple the drive unit and the driving wheel arrangement in response to the received starting signal, particularly always or only when needed, particularly for opening the clutch with the aid of a clutch actuator, particularly an at least partially electric clutch actuator.

In an embodiment, the control system may be further configured to detect that the motor vehicle is at a standstill when at least one brake of the motor vehicle is closed, to determine that at least one brake of the motor vehicle is closed, or to detected that the drive unit and the driving wheel arrangement are decoupled, particularly that the clutch is opened or the gearbox is decoupled, within a predefined period before, during or after the reception of the starting signal.

In an embodiment, the control system may be further configured to close at least one brake of the motor vehicle, particularly in an at least partially electric fashion, in response to the received starting signal, particularly always or only when needed.

In an embodiment, the control system may be further configured to decouple the drive unit and the driving wheel arrangement after at least one brake of the motor vehicle has been closed in response to the received starting signal or when it is determined that at least one brake of the motor vehicle is closed.

In an embodiment, the control system may be further configured to control, particularly starting and/or regulating, at least one device, particularly a temperature control device, particularly a heating device, of the motor vehicle in response to the starting signal when the drive unit is started or after the drive unit has been started.

In an embodiment, the control system may be further configured to receive the starting signal wirelessly and/or from a transmitter that is located at a distance from the motor vehicle.

In the context of the present disclosure, the control system may be realized in the form of hardware and/or software technology, particularly in the form of a digital processing unit, particularly a microprocessor unit (CPU), which is preferably data-linked and signal-linked to a storage and/or bus system, and/or include one or more programs or program modules. The CPU may be configured for processing commands that are implemented in the form of a program stored in a storage system, for acquiring input signals from a data bus and/or for delivering output signals to a data bus. A storage system may include one or more storage mediums, particularly different storage mediums, particularly optical, magnetic, solid state and/or other non-volatile mediums. The program may be realized in such a way that it embodies or is capable of carrying out the methods described herein such that the CPU can carry out the processes, functions, blocks and/or steps of such methods, particularly in order to thereby start the drive unit. In an embodiment, the method, particularly all processes, functions, blocks and/or steps are carried out in a completely or partially automated fashion, particularly by the control system.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
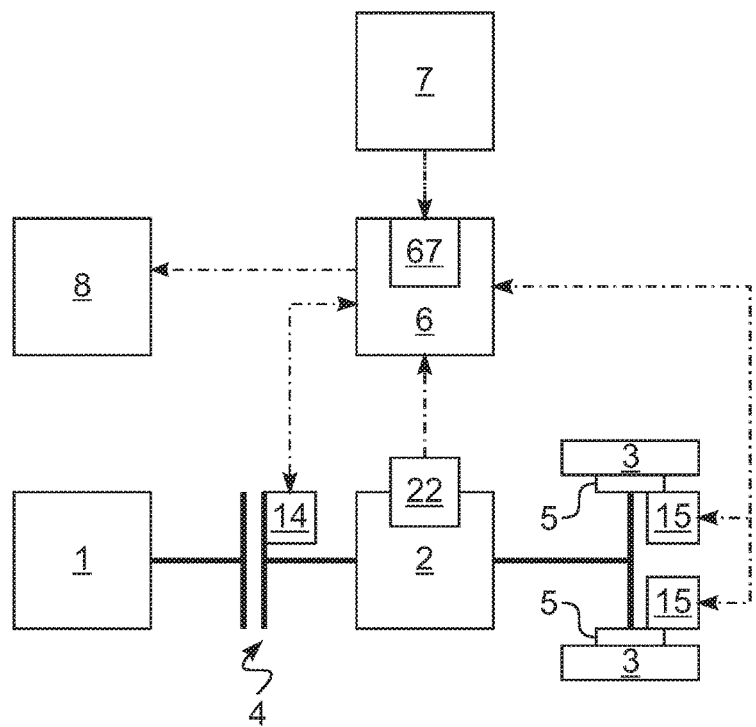
FIG. 1 shows a motor vehicle according to an embodiment of the present disclosure with a drive unit.

FIG. 1 shows a motor vehicle according to an embodiment of the present disclosure with a drive unit 1 for driving the driving wheels of a driving wheel arrangement 3 via a gearbox 2, namely a manual gearbox in the exemplary embodiment. A clutch 4 selectively couples and decouples or operably separates the drive unit 1 and the gearbox 2. The clutch can be actuated by a clutch actuator 14 of a so-called "e-clutch." The vehicle features service brakes 5 that serve for braking the driving wheels 3 and can be actuated by a multi-part brake actuator 15 of an electric brake booster. An ECU 6 of the control system controls the clutch actuator 14 and the brake actuator 15 and carries out a method for controlling a motor vehicle according to an embodiment of the present disclosure, which is described below with reference to FIGS. 2, 3.

Figure 2:
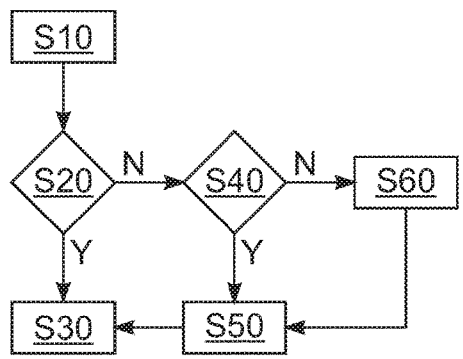
FIG. 2 shows a method for starting the drive unit according to an embodiment of the present disclosure.

FIG. 2 shows a method for starting the drive unit 1 according to an embodiment of the present disclosure. At block S10, the ECU 6 of the control system wirelessly receives a remote (control) starting signal from a transmitter 7, which is located at a distance from the motor vehicle, with the aid of a corresponding receiver 67.

At block S20, the ECU 6 checks if the gearbox 2 is decoupled, for example with the aid of a sensor 22 configured for this purpose, within a predefined period or checking cycle that is initiated with the reception of the starting signal. In a modified embodiment, a gearbox actuator configured to shift the gearbox 2 in an at least partially automated fashion may also be configured to aor aid with checking the gearbox status. Additionally or alternatively, the sensor 22 may also check at block S20 if the clutch 4 is opened, for example with the aid of a clutch actuator 14 or another sensor or actuator configured for this purpose.

When the gearbox 2 is decoupled or the clutch 4 is opened (S20: "Y"), the control system with the ECU 6 starts the drive unit 1 and after a predefined (lead) time a heating device 8 (block S30). In this case, it is assumed that the motor vehicle is shut down or parked in a horizontal position with the aid of at least one brake such as a parking brake, particularly an electric parking brake, because it is up to this point not stopped by the drive unit (that is decoupled from the driving wheels 3).

When the gearbox 2 is not decoupled or the clutch 4 is closed (S20: "N"), the method or the control system with the ECU 6 checks if one or more (checkable) brakes are closed at block S40. These brakes may be the service brakes 5 that can be actuated by the brake actuator 15. In this case, the control system with the ECU 6 can check their status with the aid of the brake actuator 15 or another sensor or actuator configured for this purpose.

The checkable brakes may likewise be different brakes such as a parking brake, particularly an electric parking brake, and the status of the parking brake may be checked with the aid of a sensor or actuator configured for this purpose.

When at least one of the brakes checked at block S40 is closed (S40: "Y"), the control system with the ECU 6 opens the clutch 4 with the aid of the clutch actuator 14 (block S50) and continues with block S30, i.e. it starts the drive unit 1 and the heating device 8. When the brake(s) checked at block S40 is or are not closed (S40: "N"), the control system with the ECU 6 closes the service brakes 5 with the aid of the brake actuator 15 (block S60) and then continues with above-described block S50.

Figure 3:
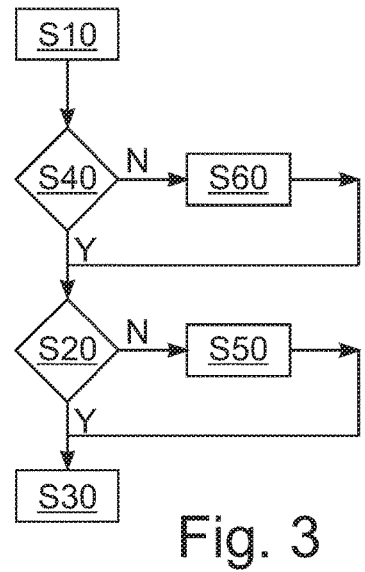
FIG. 3 shows a method for starting the drive unit according to another embodiment of the present disclosure.

FIG. 3 shows a method for controlling a motor vehicle according to another embodiment of the present disclosure. Corresponding characteristics are identified by identical reference symbols such that we refer to the preceding description and only corresponding variances are discussed below. In the embodiment according to FIG. 3, one or more brakes such as the service brakes 5, which can be actuated by the brake actuator 15, or different brakes, particularly an electric parking brake, may be initially checked (block S40) and, if applicable, the service brakes 5 are closed (block S60) if the brakes checked at block S40 are not closed (S40: "N").

When the brakes checked at block S40 are closed (S40: "Y"), the status of the clutch 4 or the gearbox 2 is subsequently checked (block S20) directly after block S40 and, if applicable, the clutch 4 is opened (block S50) when the gearbox 2 is not decoupled or the clutch 4 is closed (S20: "N").

When the drive unit 2 and the driving wheel arrangement with the driving wheels 3 are already decoupled (S20: "Y"), the method or the control system with the ECU 6 subsequently continues with block S30 for starting the drive unit 1 and the heating device 8, directly after block S20.

Although exemplary embodiments were elucidated in the preceding description, it should be noted that numerous modifications are possible. In the embodiment according to FIG. 3, for example, block S40 and, if applicable, block S60 or block S20 and, if applicable, block S50 can be selectively eliminated, i.e. the start of the drive unit may only be dependent on the clutch 4 or the gearbox 2 or only on the brake(s) checked in the block S40. When the gearbox 2 is in a modified embodiment a (partially) automated gearbox rather than a manual gearbox, the gearbox 2 can additionally or alternatively also be decoupled with the aid of the gearbox actuator 22, preferably by corresponding the actuating the clutch 4 with the aid of the clutch actuator 14.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method for starting a drive unit of a motor vehicle having a driving wheel, a clutch, a gearbox for coupling and decoupling the drive unit and the one or more driving wheels and brakes associated with the one or more driving wheels, the method comprising:
   receiving, by a processor, a starting signal from a transmitter remote from the vehicle;
   detecting, by the processor, whether the clutch is closed;
   based on the detecting that the clutch is closed, detecting, by the processor, whether the brakes are closed such that the motor vehicle is at a standstill;
   based on the detecting the brakes are closed, controlling, by the processor, a clutch actuator to move the clutch from closed to opened;
   starting the drive unit, by the processor, in response to the starting signal based on the brakes being closed and the clutch being opened; and
   starting, by the processor, a temperature control device a predetermined period of time after the starting the drive unit.

2. The method according to claim 1, further comprising: based on the detecting that the clutch is closed, detecting, by the processor, whether the gearbox is decoupled from the drive unit.

3. The method according to claim 1, further comprising decoupling, by the processor, the drive unit and the one or more driving wheels in response to the vehicle receiving the starting signal.

4. The method according to claim 1, further comprising decoupling, by the processor, the drive unit and the one or more driving wheels after closing the brakes of the motor vehicle in response to the vehicle receiving the starting signal.

5. A control system for remotely starting a drive unit of a motor vehicle having a driving wheel, a clutch, a gearbox for coupling and decoupling the drive unit and the driving wheel, and a brake associated with the driving wheel, the control system comprising a control unit, having a processor, configured to:
   receive a starting signal from a transmitter remote from the vehicle;
   detect whether the clutch is closed;
   based on the detection that the clutch is closed, detect whether the gearbox is coupled to the drive unit;
   based on the detection that the gearbox is coupled, detect whether the brake is opened;
   based on the detection that the brake is opened, control a brake actuator to move the brake from opened to closed;
   based on the brake being closed, control a clutch actuator to move the clutch from closed to opened;
   start the drive unit in response to the starting signal based on the brake being closed and the clutch being opened; and
   start a temperature control device a predetermined period of time after the start of the drive unit.

6. A motor vehicle comprising:
   a drive unit;
   a driving wheel arrangement including at least one driving wheel;
   a clutch and a gearbox operable to selectively couple the drive unit and the driving wheel arrangement; and
   a control unit system, having a processor, configured to:
   receive a starting signal from a transmitter remote from the vehicle;
   detect whether the clutch is closed;
   based on the detection that the clutch is closed, detect whether the gearbox is coupled to the drive unit;
   based on the detection that the gearbox is coupled, detect whether the brake is opened;
   based on the detection that the brake is opened, control a brake actuator to move the brake from opened to closed;
   based on the brake being closed, control a clutch actuator to move the clutch from closed to opened;
   start the drive unit in response to the starting signal based on the brake being closed and the clutch being opened; and
   start a heating device a predetermined period of time after the start of the drive unit.

* * * * *